US008128776B2

(12) United States Patent
Schuetz et al.

(10) Patent No.: US 8,128,776 B2
(45) Date of Patent: Mar. 6, 2012

(54) METHOD FOR MAKING A CONTAINER LID FORMED AS A LAMINATE HAVING A BUILT-IN OPENING FEATURE

(75) Inventors: Jeffrey M. Schuetz, Florence, SC (US); Teddy M. Westphal, Florence, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 12/819,531

(22) Filed: Jun. 21, 2010

(65) Prior Publication Data
US 2010/0255972 A1 Oct. 7, 2010

Related U.S. Application Data

(62) Division of application No. 11/289,006, filed on Nov. 29, 2005, now Pat. No. 7,757,879.

(51) Int. Cl.
*B32B 38/04* (2006.01)
*B65D 51/20* (2006.01)

(52) U.S. Cl. ...... 156/253; 156/250; 156/252; 220/258.2

(58) Field of Classification Search ............. 156/250, 156/252, 253; 220/258.1, 258.2, 270, 359.1, 220/359.2; 493/103, 108, 110, 160
See application file for complete search history.

(56) References Cited

U.S. PATENT DOCUMENTS

| 3,195,764 A | 7/1965 | Fried et al. |
| 3,200,985 A * | 8/1965 | Ashley .......................... 220/270 |
| 3,220,599 A | 11/1965 | Fried et al. |
| 3,317,068 A | 5/1967 | Betner |
| 3,951,331 A | 4/1976 | Smith et al. |
| 4,209,126 A * | 6/1980 | Elias .......................... 229/123.2 |
| 4,280,653 A * | 7/1981 | Elias .......................... 229/123.1 |
| 4,418,831 A | 12/1983 | Schellenberg |
| 4,556,152 A | 12/1985 | Bogren |
| 4,632,298 A | 12/1986 | Schellenberg |
| 4,693,390 A | 9/1987 | Hekal |
| 4,744,484 A | 5/1988 | Grabher |
| 5,004,111 A | 4/1991 | McCarthy |
| 5,511,680 A * | 4/1996 | Kinne .......................... 206/276 |
| 6,497,336 B2 | 12/2002 | Grayer |
| 2002/0003143 A1 | 1/2002 | Grayer |

FOREIGN PATENT DOCUMENTS

DE 32 12 990 A1 11/1982
EP 0 262 652 4/1988

OTHER PUBLICATIONS

The International Search Report for PCT Application No. PCT/US2006/060869; Filed Nov. 14, 2006; Date of Completion Mar. 7, 2007; Date of Mailing Mar. 20, 2007.

* cited by examiner

*Primary Examiner* — Mark A Osele
*Assistant Examiner* — Christopher C Caillouet
(74) *Attorney, Agent, or Firm* — Alston & Bird LLP

(57) ABSTRACT

A container lid is formed as a flexible laminate of an upper layer and a lower layer and having a built-in opening feature. A pair of radially spaced concentric lines of weakness are formed in the laminate, an outer one of the lines of weakness being formed in the upper layer and an inner one of the lines of weakness being formed in the lower layer. The upper and lower layers in an annular region between the lines of weakness are readily peeled apart. The upper and lower layers outside the annular region are laminated together with an adhesive providing a bond with a greater peel strength than that required to separate the layers in the annular region.

8 Claims, 5 Drawing Sheets

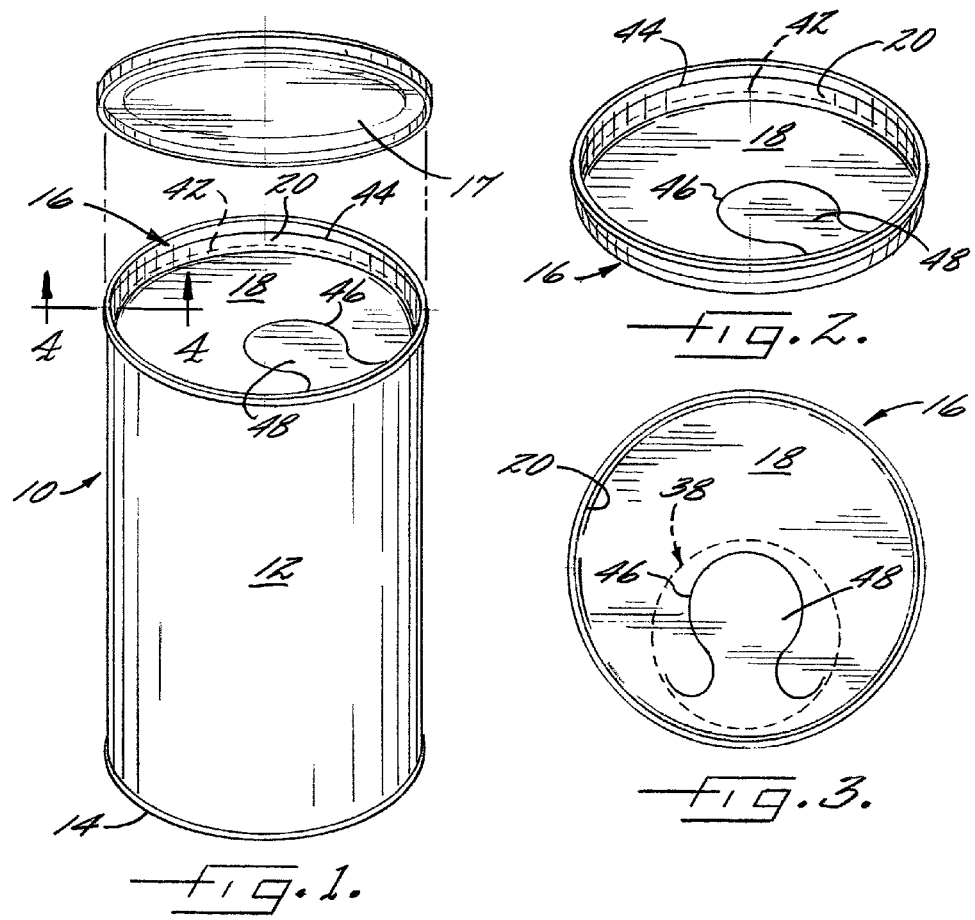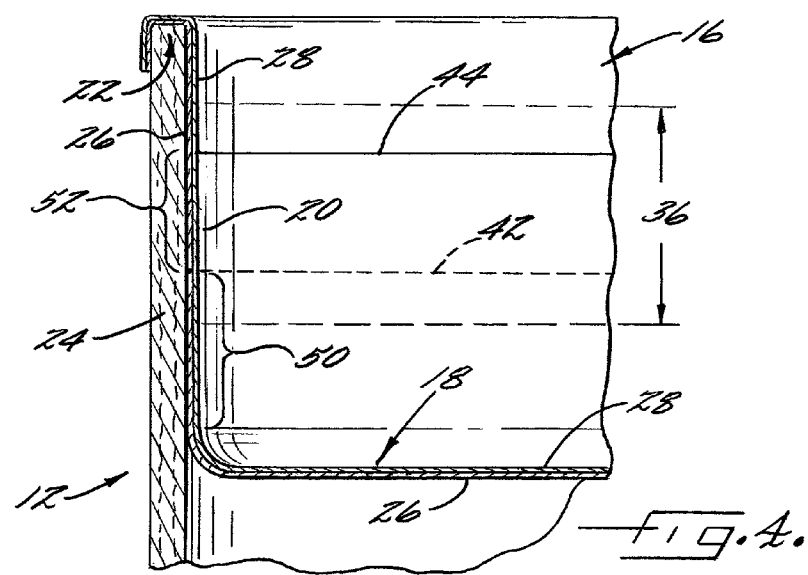

2

METHOD FOR MAKING A CONTAINER LID FORMED AS A LAMINATE HAVING A BUILT-IN OPENING FEATURE

CROSS REFERENCE TO RELATED APPLICATIONS

This application is a divisional application of U.S. patent application Ser. No. 11/289,006, filed Nov. 29, 2005, now U.S. Pat. No. 7,757,879, the entire disclosure of which is hereby incorporated herein by reference.

BACKGROUND OF THE INVENTION

The present invention relates to containers sealed with flexible lids formed from materials such as polymer film, aluminum foil, paper, and the like.

It is known to seal a container with a lid formed from a heavy-gauge aluminum foil having a heat-sealable material on its underside. The lid is shaped to include a cylindrical skirt that extends upwardly from an outer periphery of a center panel of the lid, such that the heat-sealable material is on the radially outwardly facing side of the skirt. The skirt is heat-sealed to a generally cylindrical inner surface of the container body adjacent the open end of the container, the center panel of the lid thus being recessed below a top edge of the container body. The lid includes a line of weakness such that the center panel can be torn free of the skirt, at least part of which remains attached to the container body. A pull tab is attached to the top surface of the center panel to aid the user in tearing out the center panel. The pull tab typically is heat-sealed to the center panel. For example, a container and lid generally as described above are disclosed in U.S. Pat. No. 4,744,484 to Grabher.

A difficulty associated with such container lids arises because of inevitable variations in the strength of the bond between the tab and the center panel. Such variations are due to mechanical process and material variations that are difficult to control or eliminate. Additionally, it has been found that the tab bond strength tends to diminish with aging of the lid. Accordingly, it can be expected that some proportion of the lids produced according to the conventional process will have a tab bond strength that is less than the force required to detach the center panel from the skirt. When the user pulls on the tab of such a lid, the tab will tend to come off the center panel and the user will then have to resort to other means to open the container, such as puncturing the lid with a sharp implement and then tearing out the lid in pieces. This is inconvenient for the user.

BRIEF SUMMARY OF THE INVENTION

The present invention addresses the above needs and achieves other advantages, by providing a lid formed as a laminate having a built-in opening feature employing a different opening mechanism that is more-controllable in terms of opening force than the conventional type of lid described above. In accordance with one embodiment of the invention, a lid for a container comprises a flexible laminate comprising an upper layer and a lower layer, a pair of radially spaced concentric lines of weakness being formed in the laminate, an outer one of the lines of weakness being formed in the upper layer and an inner one of the lines of weakness being formed in the lower layer. Each line of weakness comprises a cut extending partially or entirely through the thickness of the respective layer, and allows the layer to sever along the line with little or no force. An annular region is thus defined between the lines of weakness. The upper and lower layers outside the annular region are laminated together with an adhesive providing a bond with a sufficient peel strength to keep the layers from separating when the lid is pulled to detach it from the container, and hence the inner layer severs along the inner line of weakness and the layers then separate from each other in the annular region until the outer line of weakness is reached. The outer layer then severs along the outer line of weakness so that the lid comes free of the container.

The separability of the layers in the annular region in some embodiments can be provided by disposing a readily peelable adhesive in the annular region between the layers. In other embodiments, the separability is achieved by providing no adhesive in the annular region. Thus, the layers are adhered to each other outside the annular region but are not adhered in the annular region.

Preferably, the lid is shaped to have a central panel that is generally disk-shaped and to have a generally cylindrical skirt joined to an outer periphery of the central panel and extending upwardly therefrom such that the lower layer of the skirt faces radially outwardly. The skirt is structured and arranged to be bonded to the inner surface of a container body. The lines of weakness are both located on the skirt, with the outer line of weakness being spaced above the inner line of weakness.

Preferably, an integral tab is formed in the upper layer of the center panel. The tab is formed by cutting through the thickness of the upper layer along a generally U-shaped cut line. Preferably, there is no adhesive underlying the tab so that the tab can be lifted away from the lower layer of the lid and pulled to detach the center panel from the skirt.

The upper layer of the lid can be a monolayer or a multi-layer structure. For instance, the upper layer can be a single layer of polymer film such as polyester (e.g., PET). Alternatively, the upper layer can be a lamination of a polymer film such as polyester and a barrier layer such as aluminum foil.

In embodiments employing adhesive in the annular region, the adhesive preferably is a pressure-sensitive adhesive (PSA). Outside the annular region a different adhesive, such as a conventional laminating adhesive, is employed. The PSA "bridges the gap" between the lines of weakness. Preferably, the PSA also extends somewhat outward of the outer line of weakness and somewhat inward of the inner line of weakness so that slight errors in the locations of the lines of weakness because of manufacturing tolerances will not result in either line of weakness being in a location where the stronger laminating adhesive is present.

In yet other embodiments of the invention, a readily peelable adhesive providing a relatively low peel strength can be disposed both outside and within the annular region between the score lines. For example, the adhesive can be flood-coated onto one of the layers prior to lamination.

In operation, the tab is pulled upwardly and generally away from the portion of the skirt adjacent the tab. Initially, a portion of the skirt adjacent the outer periphery of the center panel begins to detach from the container body until the inner (lower) line of weakness is reached, and then the lower layer begins to sever along the inner line of weakness. Further pulling of the center panel away from the skirt causes the upper layer to begin separating from the lower layer in the annular region between the lines of weakness. In those embodiments in which no adhesive is present in the annular region, the upper layer will immediately separate from the lower layer up to the outer (upper) line of weakness. In other embodiments in which PSA is present in the annular region, the PSA allows the layers to readily peel apart. When the outer (upper) line of weakness is reached, the upper layer begins to sever along the outer line of weakness, and the center panel finally is completely detached from the skirt, which remains attached to the container body.

The invention also provides a container having a lid as described above.

A method for making a lid in accordance with one embodiment of the invention comprises the steps of: (1) forming a first line of weakness in a first polymer film layer, the first line of weakness extending in a closed loop about a center point on the first polymer film layer, the first line of weakness weakening the first polymer film layer such that severing of the first polymer film layer preferentially occurs along the first line of weakness; (2) forming a second line of weakness in a second polymer film layer, the second line of weakness extending in a closed loop about a center point on the second polymer film layer and being configured such that when the first and second polymer film layers are superimposed on each other with the respective center points aligned, the second line of weakness is substantially concentric with and spaced radially inward from the first line of weakness such that an annular region of each polymer film layer is defined between the first and second lines of weakness; (3) applying an adhesive to areas of one of the first and second polymer film layers at least outside the annular region; and (4) superimposing the first and second polymer film layers upon each other with the respective center points aligned such that the polymer film layers are laminated together by the adhesive to form a laminate.

The method preferably also includes the steps of cutting the laminate along a cut line extending in a closed loop about the aligned center points and lying radially outward of the first line of weakness so as to form a disk-shaped laminate, and deforming the disk-shaped laminate to form a cylindrical skirt that extends upwardly from an outer periphery of a center panel of the disk-shaped laminate, the skirt being formed such that the second polymer film layer faces radially outward and the first polymer film layer faces radially inward relative to the center points. The deforming step is carried out such that both the first and second lines of weakness are located on the skirt, the first line of weakness being spaced above the second line of weakness. The lid can be formed while disposed atop the container, such that the lid is urged down into the container and shaped to have the skirt, which can extend up over the top edge of the container body. Vacuum can be used to hold the lid in place and then a heat-seal tool can be moved into the container to heat the skirt to seal the skirt to the container body.

In a preferred embodiment, an integral tab is formed in the center panel by cutting the first layer along a generally U-shaped cut line. The adhesive-applying step preferably is carried out such that the polymer film layers are free of adhesive in the tab region, so that the tab can be lifted away from the second layer.

In an alternative embodiment of the invention, the laminate for forming the lid includes an inner line of weakness in the lower layer as described above, but the outer line of weakness is omitted. The upper and lower layers are adhered over their entire surfaces with an adhesive such as a low bond-strength adhesive or PSA. The lid is formed such that the skirt terminates at its top end on the inner surface of the container body. In operation, the tab is pulled upwardly and generally away from the portion of the skirt adjacent the tab. Initially, a portion of the skirt adjacent the outer periphery of the center panel begins to detach from the container body until the inner line of weakness is reached, and then the lower layer begins to sever along the inner line of weakness. Further pulling of the center panel away from the skirt causes the upper layer to peel away from the lower layer until the top end of the skirt is reached, at which point the center panel comes free of the container.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a perspective view of a container incorporating a lid in accordance with one embodiment of the invention;

FIG. 2 is a perspective view of the lid;

FIG. 3 is a top elevation of the lid;

FIG. 4 is a greatly magnified cross-sectional view along line 4-4 in FIG. 1;

DETAILED DESCRIPTION OF THE INVENTION

Figure 5:
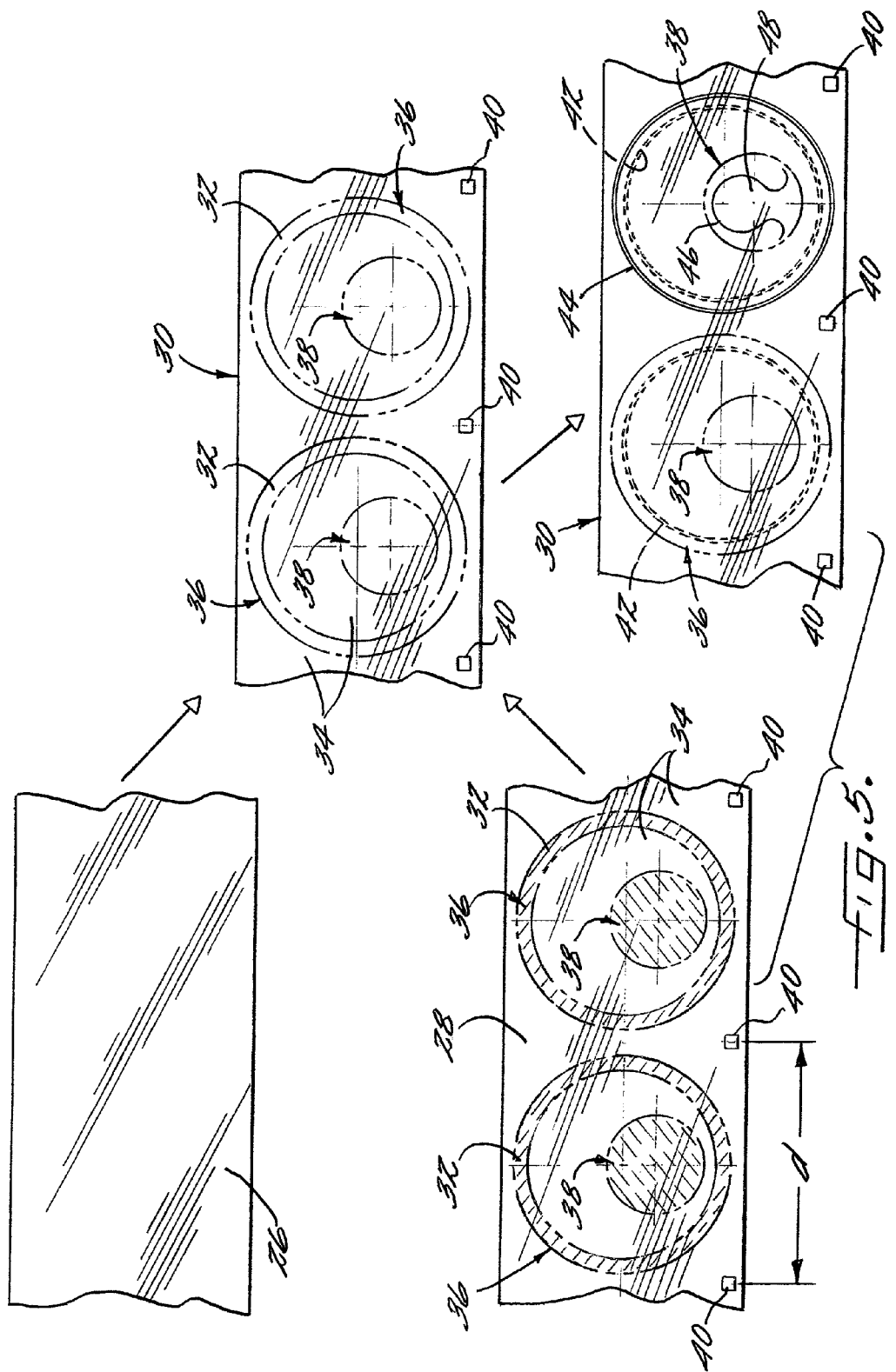
FIG. 5 is a diagrammatic depiction of a method for making a lid in accordance with one embodiment of the invention.

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A container 10 in accordance with one embodiment of the invention is illustrated in FIG. 1. The container comprises a tubular container body 12, a bottom end closure 14 affixed to a bottom end of the container body, and a top end closure or lid 16 affixed to a top end of the container body. The lid 16 has a built-in opening feature facilitating removal of a portion of the lid to gain access to the contents of the container. After the initial opening, a separate overcap 17 or the like can be engaged on the top end of the container body to keep any remaining contents from being exposed to the atmosphere.

The lid 16 is formed from a laminate of flexible sheet materials. As further described below, the laminate is die-cut to produce a disk-shaped laminate or lid blank that is subsequently shaped by suitable tooling into a form as best seen in FIGS. 2 and 4. The lid has a generally planar center panel 18 and a generally cylindrical skirt 20 that extends upwardly from an outer periphery of the center panel. A top end of the skirt can be shaped to curl outwardly and downwardly so as to define a channel 22 (FIG. 4) that receives the top edge of the side wall 24 of the container body. The center panel 18 is recessed below the top edge of the container body side wall 24, as best seen in FIG. 4. The skirt 20 is bonded to the inner surface of the container body side wall 24 to seal the top end of the container closed.

With reference to FIG. 5, a method is now described for producing a laminate from which the lid 16 is made. The laminate is constructed from a lower layer 26 of flexible sheet material and an upper layer 28 of flexible sheet material. The lower layer 26 preferably comprises a polymer film that is heat-sealable to a heat-sealable material disposed on the inner surface of the container body side wall. Suitable examples of such heat-sealable polymer films include but are not limited to polyolefins such as polypropylene, polyethylene, and the like, or an ionomer resin such as SURLYN® or the like. The upper layer 28 preferably comprises a polymer film. Suitable examples of polymer films for the upper layer include but are not limited to polyester such as polyethylene terephthalate (PET), metallized PET, oriented polypropylene (OPP), metallized OPP, or the like. If desired for barrier and/or appearance reasons, the upper layer can be metallized by vapor-depositing a thin layer of substantially pure metal such as aluminum onto one surface of the film. The upper layer also can comprise a multilayer laminated structure such as a polymer film laminated to a barrier layer (e.g., aluminum foil). The upper and lower layers are adhesively laminated together to form a laminate 30. The melting temperature of the upper layer desirably should be higher than that of the lower layer by a sufficient margin to ensure that heating of the laminate for heat-sealing the lower layer to a container body side wall does not cause melting of the upper layer.

In one embodiment, a lower surface of the upper layer 28 that faces the lower layer is pattern-printed with an adhesive 34. The adhesive 34 is a laminating adhesive formulated to bond the layers together with a substantially higher bond strength than the first adhesive such that the layers bonded together by the adhesive are not readily peelable from each other. The laminating adhesive can be, for example, a two-component polyurethane adhesive system, such as Tycel 7900/7283 available from Henkel. The laminating adhesive 34 is applied to the upper layer in such a manner that a sufficiently large proportion of the surface is covered by the adhesive to permit the upper layer to be adhesively attached to the lower layer 26 at a downstream laminating station. The laminating adhesive 34 is not applied to an annular region 36 of the upper layer. In this embodiment, the annular region 36 is free of adhesive. The annular region 36 is dimensioned to occupy the area of the skirt 20 of a lid fashioned from the laminate 30. The adhesive 34 is applied to those areas outside the annular region 36, except that a region 38 that lies within the interior of the annular region 36 is kept free of adhesive for reasons soon to become apparent. Thus, the laminating adhesive must be applied by an apparatus capable of accurately applying the adhesive in a predetermined pattern, in registration with the pressure-sensitive adhesive but not covering it. A suitable adhesive application device can be a gravure roll.

In another embodiment, a lower surface of the upper layer 28 that faces the lower layer is pattern-printed with a first adhesive 32 as well as with a second adhesive 34. The first adhesive 32 is applied to the annular region 36 of the upper layer. The second adhesive 34 is applied to those areas outside the annular region 36, except that a region 38 that lies within the interior of the annular region 36 is kept free of adhesive as in the prior embodiment above. The first adhesive 32 is formulated to allow the layers bonded together by the adhesive to be readily peeled apart with relatively low peel force. The first adhesive advantageously can comprise a pressure-sensitive adhesive (PSA). Pressure-sensitive adhesives are often based on non-crosslinked rubber adhesives in a latex emulsion or solvent-borne form, or can comprise acrylic and methacrylate adhesives, styrene copolymers (SIS/SBS), and silicones. Acrylic adhesives are known for excellent environmental resistance and fast-setting time when compared with other resin systems. Acrylic pressure-sensitive adhesives often use an acrylate system. Natural rubber, synthetic rubber or elastomer sealants and adhesives can be based on a variety of systems such as silicone, polyurethane, chloroprene, butyl, polybutadiene, isoprene, or neoprene. When the laminate of the invention is to be used for food packaging, the pressure-sensitive adhesive generally must be a food-grade composition. Various pressure-sensitive adhesives are approved by the U.S. Food and Drug Administration for use in food packaging, as regulated by 21 CFR Part 175. A preferred food-grade pressure-sensitive adhesive for use in the present invention is Jonbond 743 available from Bostik Findley. Additives (e.g., particulates or the like) can be added to the pressure-sensitive adhesive to reduce the tenacity of the bond, if desired.

As evident from FIG. 5, the lower and upper layers 26, 28 advantageously comprise continuous lengths of the film material drawn from supply rolls (not shown) and advanced by web-handling equipment through a series of work stations at which different operations are performed on the layers. Thus, for example, the upper layer 28 is advanced to a pattern-printing station at which the adhesive 34, or both adhesives 32, 34, is/are pattern-printed onto the lower surface of the film using suitable equipment such as a gravure roll or the like. The adhesive is applied in a recurring pattern that repeats at intervals d (referred to as the "index distance") along the length of the film so that multiple lids can be die-cut in proper register from the laminate 30 in a continuous manufacturing process. The upper layer 28 advantageously has a repeating eye mark 40 or other feature that is present on the layer at intervals equal to the index distance d and is detectable by an optical detector (not shown) or the like for purposes of controlling the timing of certain operations during the production of the laminate. After the adhesive application at the adhesive-application station, the layers 26, 28 are brought together in superimposed relation and laminated together at a laminating station (not shown) to form the laminate 30.

The laminate is then advanced to a cutting station (not shown) at which a pair of lines of weakness are formed in the laminate. More specifically, an inner line of weakness 42 is formed in the lower layer 26. The inner line of weakness 42 comprises a cut extending partially, or preferably entirely, through the thickness of the lower layer, and can be formed by mechanical technique such as die-cutting (so-called "kiss" cutting). Alternatively, the line of weakness can be formed by use of a laser. The use of lasers for scoring through polymer films and laminates is generally known, for example as described in U.S. Pat. No. 5,158,499, incorporated herein by reference. The depth of the score line formed by the laser can be regulated by regulating the power output or beam intensity of the laser beam, the width or spot size of the laser beam, and the amount of time a given spot on the film surface is irradiated by the beam. These factors generally are selected based on the characteristics of the material being scored. Some materials are more readily scored by lasers than other materials, as known in the art. At any rate, the line of weakness 42 weakens the lower layer so that severing of the lower layer will occur preferentially along the line of weakness. The inner line of weakness extends in a closed loop about a center point of the annular region 36. Preferably, the inner line of weakness 42 is circular and is concentrically positioned with respect to the annular region 36, and is slightly greater in radius than the radially innermost extent of the annular region 36.

An outer line of weakness 44 is formed in the upper layer 28. The outer line of weakness 44 comprises a cut extending partially, or preferably entirely, through the thickness of the upper layer, and can be formed by mechanical technique such as die-cutting or by use of a laser. The line of weakness 44 weakens the upper layer so that severing of the upper layer will occur preferentially along the line of weakness. The outer line of weakness 44 extends in a closed loop about the center point of the annular region 36, and advantageously is circular and is concentrically positioned with respect to the inner line of weakness 42 and larger in radius than the inner line of weakness. The outer line of weakness 44 preferably is slightly smaller in radius than the radially outermost extent of the annular region 36.

Additionally, at the cutting station, preferably the outer layer 28 is die-cut or laser-cut along a generally U-shaped cut line 46 that extends through the full thickness of the upper layer, so as to form an integral pull tab 48 in the upper layer. The cut line 46 is located in the adhesive-free region 38 of the laminate so that the tab 48 can be lifted away from the lower layer 26 and grasped and pulled to open the container. Proper registration of the lines of weakness 42, 44 and cut line 46 with respect to the adhesive-free or PSA region 36 and the adhesive-free region 38 is achieved through the detection of the eye marks 40 on the laminate with an optical detector (not shown) and suitable control of the cutting equipment based on signals from the optical detector, as would be understood by one of ordinary skill in the art.

After the cutting station, the laminate is die-cut to cut out the individual lids from the laminate. For each lid, the laminate is cut along a circular cut line that is greater in radius than the outer line of weakness 44 and is concentric with respect thereto.

With reference to FIG. 4, as noted, a lid 16 is shaped by suitable tooling so that an outer peripheral portion of the disk-shaped laminate forms a cylindrical skirt 20 having a diameter corresponding to an inner diameter of the container body side wall 24. The lid can be shaped prior to being placed onto the container, although this generally will be practical only for laminates that can hold a deformed shape after the deforming forces are removed, such as laminates having a layer of aluminum foil or the like.

Alternatively, the lid shaping can be accomplished concurrently with placing the lid onto the container, as further described below in connection with FIGS. 8A and 8B.

The skirt 20 is heat-sealed to the inner surface of the container body side wall, which typically includes an impervious liner (not shown) whose inner surface has a heat-sealable material. If desired, the shaping of the lid to form the skirt and the heat-sealing of the skirt to the side wall can be accomplished substantially simultaneously. Preferably, the full axial extent of the skirt is heat-sealed to the container body side wall, including a portion 50 of the skirt extending below the inner line of weakness 42.

Figure 6A:
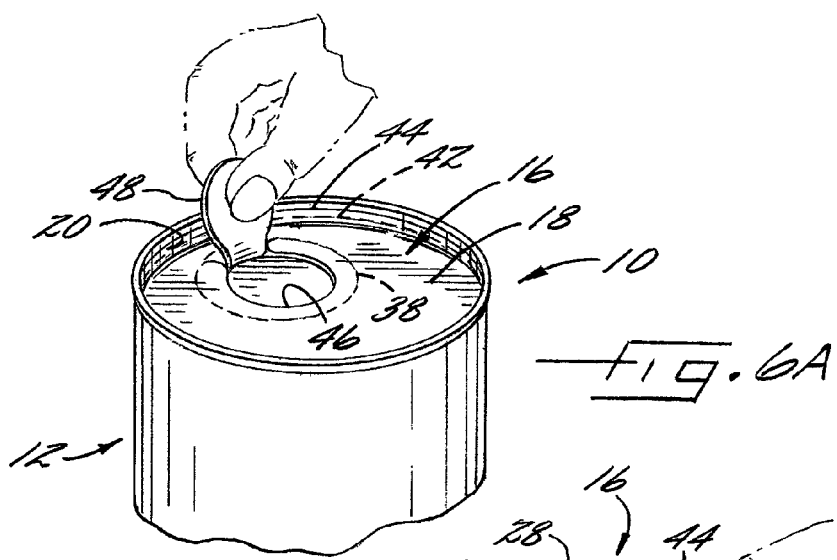
FIG. 6A is a perspective view illustrating a first step of a procedure for opening the container in accordance with one embodiment of the invention.
Figure 6B:
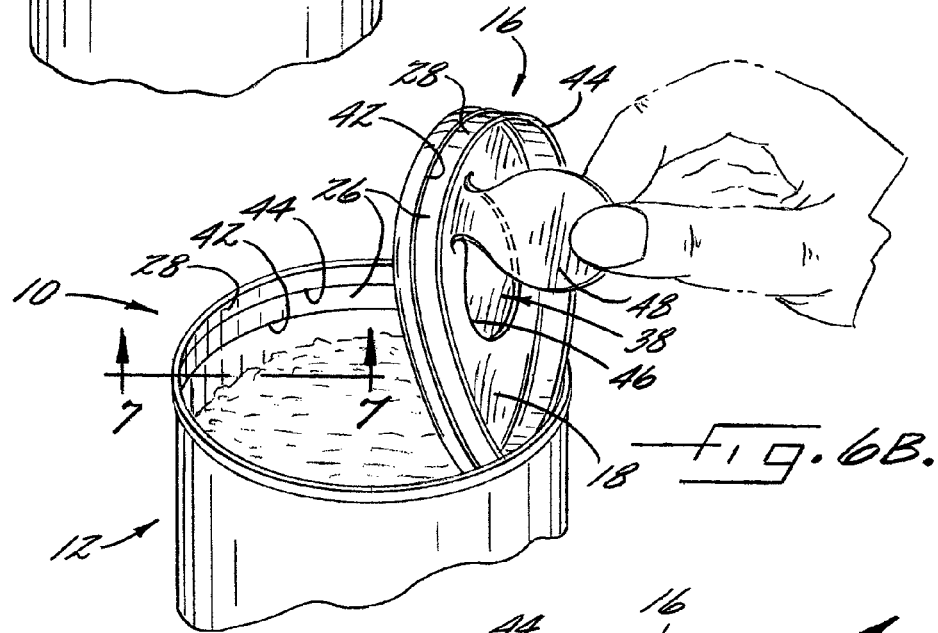
FIG. 6B is a view similar to FIG. 6A, showing a further step of the opening procedure.
Figure 7:
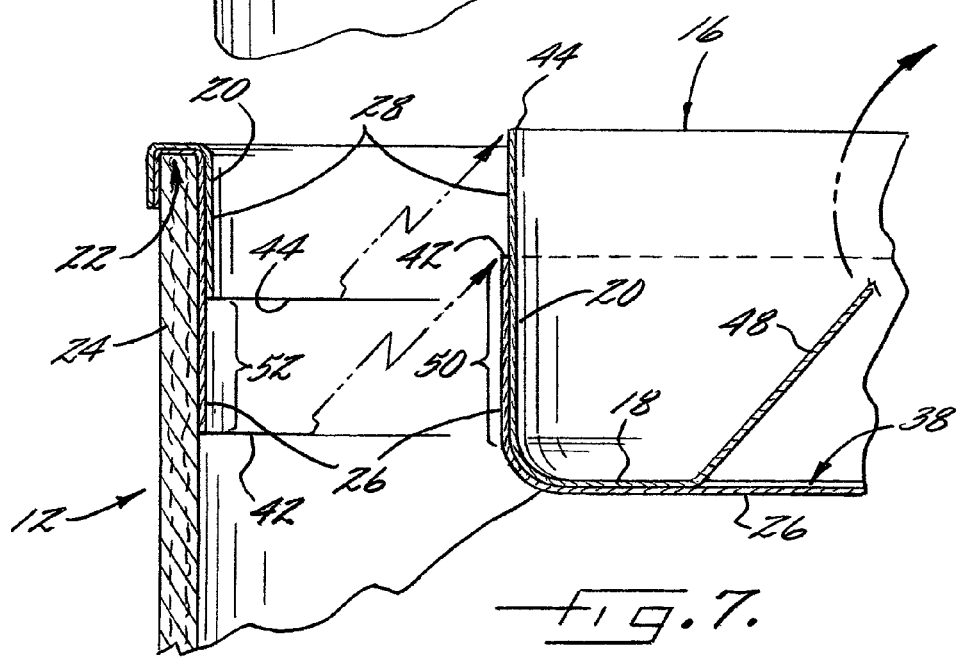
FIG. 7 is a cross-sectional view taken along line 7-7 in FIG. 6B, showing the lid after its detachment from the container body.

In operation, as illustrated in FIGS. 6A and 6B, the lid 16 is opened by lifting, grasping, and pulling the tab 48 generally upwardly and radially inwardly. The portion 50 of the skirt begins to detach from the inner surface of the side wall 24, beginning at the bottom end of the portion 50 and proceeding up toward the inner line of weakness 42. When the inner line of weakness 42 is reached, the lower layer 26 begins to sever along the inner line of weakness 42, such that now the upper layer 28 is able to start separating from the lower layer. The upper layer 28 thus begins to separate from the lower layer 26 along the annular region 52 defined between the lines of weakness 42, 44. The layers in the annular region 52 are either unadhered to each other or are joined by the PSA so that the upper layer readily separates from the lower layer, finally reaching the outer line of weakness 44. At that point, the outer layer 28 severs along the outer line of weakness, and the center panel 18 of the lid and the part of the skirt up to the outer line of weakness 44 are removed (FIG. 7). The part of the skirt above the outer line of weakness 44 remains attached to the container body side wall, as does a portion of the lower layer 26 between the lines of weakness 42, 44.

Accordingly, the opening mechanism of the lid relies on the separation of the layers 26, 28 in the adhesive-free or PSA region 36. The force needed to separate the layers in the region 36 is low enough so that the lid will open reliably, eliminating or at least greatly reducing the incidence of opening failures caused by inadvertent tab detachments or the like. The provision of an integral tab 48 further aids in preventing such failures, and saves on material and process costs ordinarily required for making and attaching a separate tab. However, it is within the scope of the invention to employ a separate tab attached to the upper layer 28.

As noted, the lid blank formed from the laminate 30 can be shaped to form the lid simultaneously with placing the lid into the container. FIGS. 8A and 8B illustrate an exemplary tooling assembly and process for carrying this out. A lid blank B is placed atop a container body 12 and a shaping tool 100 is arranged coaxially with respect to the longitudinal center axis of the container body into engagement with the lid blank and is moved along the center axis into the interior of the container body to press the blank down into the container body. The tool 100 includes a first or end portion 102 of cylindrical configuration having an outer diameter sufficiently smaller than the inner diameter of the container body so that the end portion 102 with the lid blank draped thereover fits into the container body with a relatively loose fit, but with the cylindrical skirt thereby formed in the lid engaging the inner surface of the container body. The tool includes a second portion 104 having an outer diameter approximately matching the outer diameter of the container body, and a shoulder 106 is defined at the transition between the first portion 102 and the second portion 104. The tool further includes a third portion 108 of still larger diameter than the second portion 104.

The tooling assembly further comprises a first ring 110 having an inner diameter slightly larger than the outer diameter of the container body 12, the first ring surrounding the container body to provide support to the container body in the radially outward direction. The first ring 110 is axially movable relative to the container body and is urged by a diagrammatically illustrated spring 112 in the axially upward direction. The tooling assembly also includes a second ring 114 that is slightly larger in inner diameter than the first ring 110 and larger in inner diameter than the outer diameter of the second portion 104 of the tool 100. The second ring 114 surrounds the container body and is disposed between the third portion 108 of the tool 100 and the first ring 110. A diagrammatically illustrated spring 116 urges the second ring 114 away from the tool 100 in the axially downward direction toward the first ring 110. As the lid shaping and inserting process begins, the lid blank is placed atop the container body and the first ring 110 and then the tool 100 and second ring 114 are moved as a unit to capture an outer edge of the lid blank B between the two rings 110, 114.

Figure 8A:
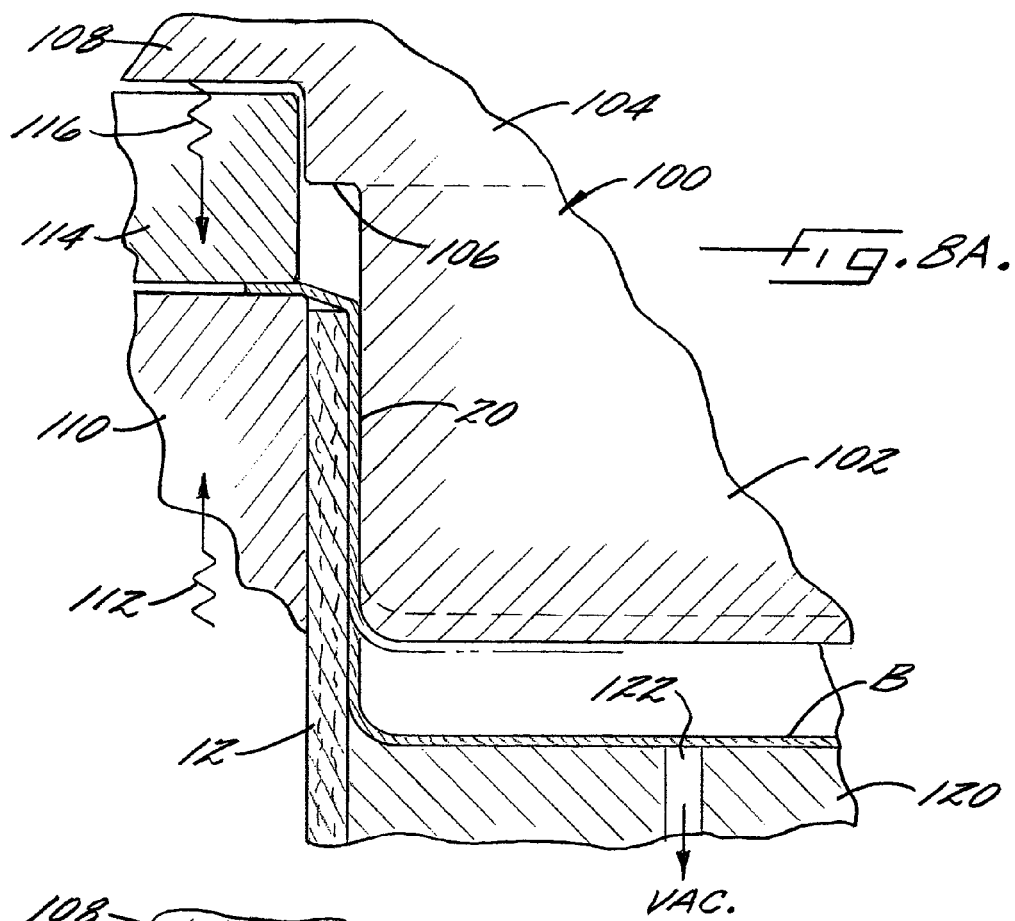
FIG. 8A is a greatly magnified cross-sectional view depicting a tooling assembly and a first step of a process for shaping a lid blank into a lid and inserting the lid into a container body in accordance with one embodiment of the invention.
Figure 8B:
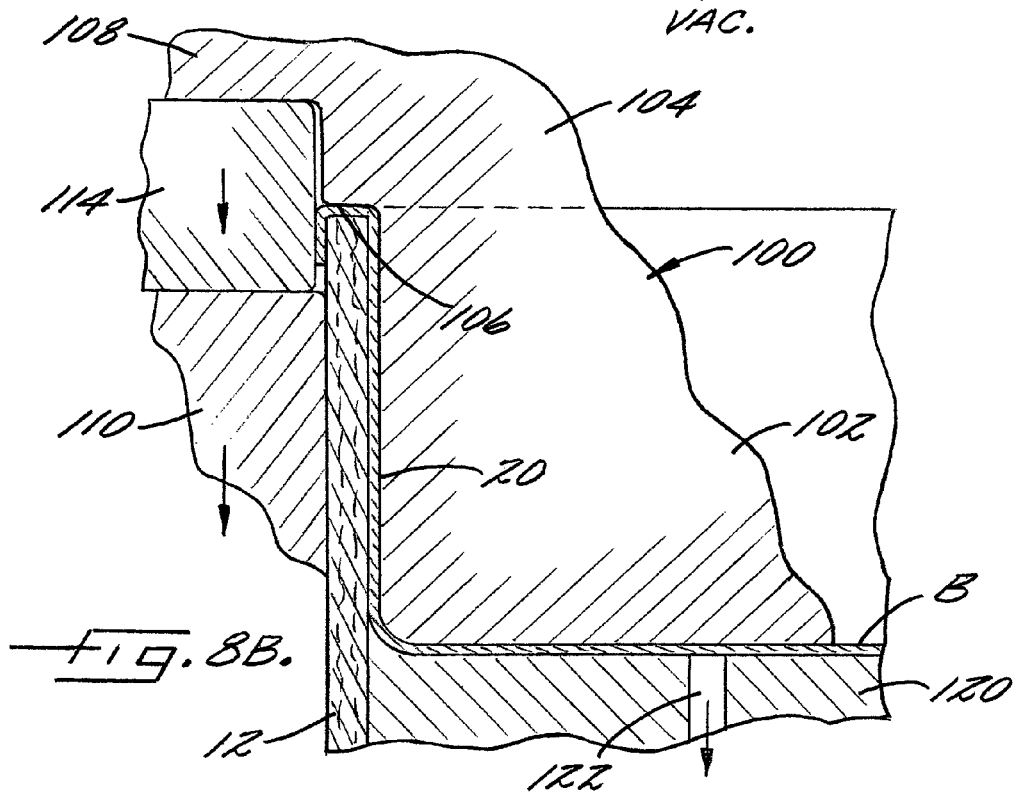
FIG. 8B is a view similar to FIG. 8A, showing a second step of the shaping and inserting process.

As illustrated in FIG. 8A, as the tool 100 is further axially advanced downward into the container body, the lid blank B is shaped to conform to the container body so as to form the skirt 20 of the lid. A cylindrical mandrel 120 having a vacuum passage 122 therethrough is disposed in the container body with its end face at an appropriate axial position with respect to the top edge of the container body so as to delimit the movement of the lid into the container body. Thus, the tool 100 pushes the lid blank down until it contacts the end face of the mandrel 120 and vacuum is exerted through the vacuum passage 122 to hold the lid in place when the tool 100 is subsequently withdrawn. As the tool 100 moves down toward the mandrel 120, the outer peripheral portion of the lid blank is still retained between the rings 110, 114, although the clamping force is sufficiently small to allow the blank to slide relative to the rings so that the lid can be shaped into the container without substantially stretching. Eventually, the shoulder 106 of the tool 100 abuts the blank atop the top edge of the container body, at which point the rings 110, 114 have moved to the position shown in FIG. 8B so that the outer edge portion of the lid blank wraps up over the top edge of the container body and onto the outer surface of the body for a short distance.

The next step in the process is to heat-seal the skirt 20 to the inner surface of the container body. This can be accomplished by raising the temperature of the tool 100 to a sufficient temperature to cause the lower layer of the lid and the heat-seal material on the container body to soften and fuse together. Alternatively, the tool 100 can be withdrawn and another heat-seal tool (not shown) can then be inserted into the container and heated to heat-seal the skirt to the container body. The heat-seal tool can be somewhat larger in diameter than the shaping tool 100 so as to firmly urge the skirt against the container body to ensure good contact and sealing therebetween.

Figure 9A:
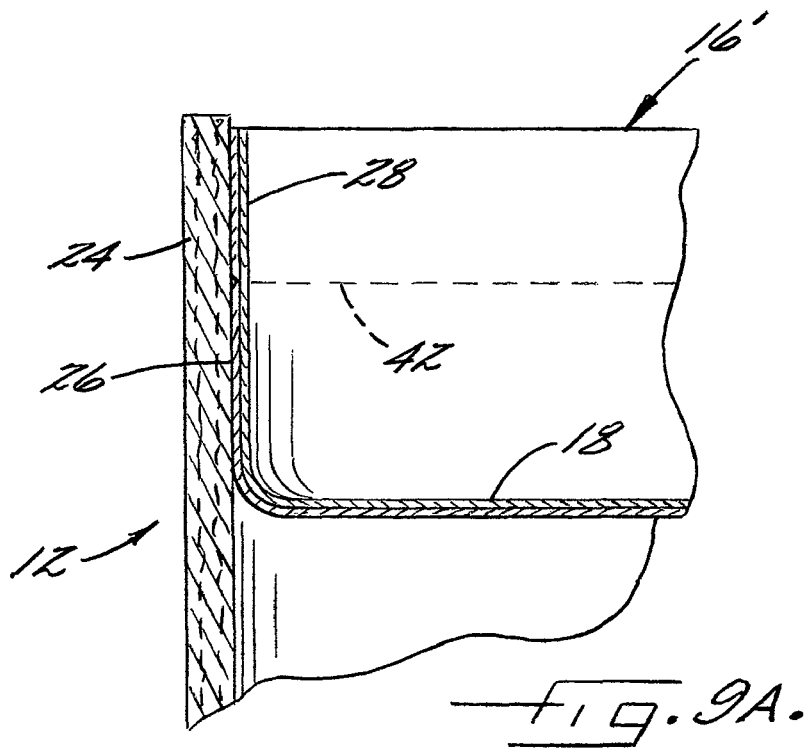
FIG. 9A is a view similar to FIG. 4, showing another embodiment of the invention.
Figure 9B:
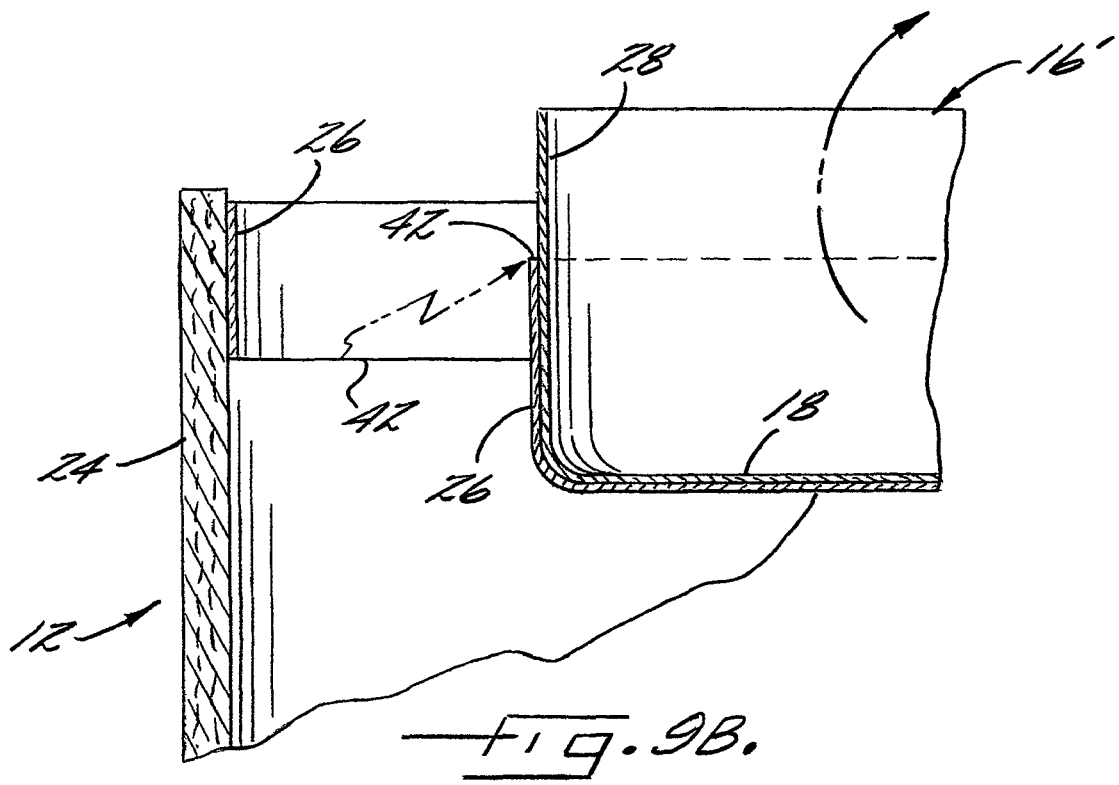
FIG. 9B shows the other embodiment after removal of the lid.

A further embodiment of the invention is depicted in FIGS. 9A and 9B, showing an alternative form of lid 16'. The lid 16' is generally similar to the lid 16 described above, except that the outer score line is omitted and the skirt terminates at a location on the inner surface of the container body 12 (e.g., where the outer score line would be located in the prior embodiment), rather than wrapping over the top edge of the container body. Thus, upon opening, the lower layer 26 severs at the score line 42 and then the upper layer 28 peels from the portion of the lower layer above the score line, which remains adhered to the container body as shown in FIG. 9B. Preferably, a peelable adhesive such as PSA is disposed between the layers in the annular region between the score line 42 and the outer peripheral edge of the lid. The upper and lower layers outside the annular region are laminated together with an adhesive providing a bond with a greater peel strength than the peel force required to separate the layers in the annular region.

Many modifications and other embodiments of the inventions set forth herein will come to mind to one skilled in the art to which these inventions pertain having the benefit of the teachings presented in the foregoing descriptions and the associated drawings. For example, while the lid 16 shown and described above has a circular peripheral shape, the present invention also encompasses lids of other shapes such as oval, rectangular, etc. In this regard, terms used herein such as "annular", "radial", "concentric", and the like, are intended to apply to all such shapes rather than being restricted to circular lids. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for making a flexible lid for a container from flexible layers of sheet material, the method comprising the steps of:
   forming a first line of weakness in a first layer, the first line of weakness extending in a closed loop about a center point on the first layer, the first line of weakness weakening the first layer such that severing of the first layer preferentially occurs along the first line of weakness;
   forming a second line of weakness in a second layer, the second line of weakness extending in a closed loop about a center point on the second layer and being configured such that when the first and second layers are superimposed on each other with the respective center points aligned, the second line of weakness is substantially concentric with and spaced radially inward from the first line of weakness such that an annular region of each layer is defined between the first and second lines of weakness;
   applying an adhesive at least to areas of one of the first and second layers outside the annular region;
   superimposing the first and second layers upon each other with the respective center points aligned such that the layers are laminated together to form a laminate; and
   cutting the laminate along a cut line extending in a closed loop about the aligned center points and lying radially outward of the first line of weakness, thereby forming a disk-shaped lid and separating the lid from a remainder of the laminate.

2. The method of claim 1, further comprising the step of applying a pressure-sensitive adhesive to one of the first and second layers in an area corresponding to the annular region.

3. The method of claim 1, wherein the applying step is performed first, then the superimposing step is performed, and then the forming steps are performed.

4. The method of claim 1, further comprising the step of cutting through a thickness of the first layer to define an integral pull tab in the first layer.

5. The method of claim 4, wherein the applying step is carried out such that a region of each of the first and second layers underlying the pull tab is free of adhesive such that the pull tab can be lifted away from the second layer.

6. The method of claim 1, further comprising the step of:
   deforming the disk-shaped lid to form a cylindrical skirt that extends upwardly from an outer periphery of a center panel of the disk-shaped lid, the skirt being formed such that the second layer faces radially outward and the first layer faces radially inward relative to the center points.

7. The method of claim 6, wherein the deforming step is carried out such that both the first and second lines of weakness are located on the skirt, the first line of weakness being spaced above the second line of weakness.

8. The method of claim 6, wherein the deforming step is carried out while the disk-shaped lid is atop a container body.

* * * * *